US012613317B2

(12) United States Patent
Xiao

(10) Patent No.: US 12,613,317 B2
(45) Date of Patent: Apr. 28, 2026

(54) TECHNIQUES FOR TUNABLE BEAM FOCUS COMPENSATION FOR MULTIPLE BEAM LIDAR SYSTEMS

(71) Applicant: Aeva, Inc., Mountain View, CA (US)

(72) Inventor: Shijun Xiao, Foster City, CA (US)

(73) Assignee: Aeva, Inc., Mountain View, CA (US)

( * ) Notice: Subject to any disclaimer, the term of this patent is extended or adjusted under 35 U.S.C. 154(b) by 1036 days.

(21) Appl. No.: 17/731,783

(22) Filed: Apr. 28, 2022

(65) Prior Publication Data

US 2023/0350025 A1    Nov. 2, 2023

(51) Int. Cl.
| | |
|---|---|
| *G01S 7/481* | (2006.01) |
| *G01S 17/89* | (2020.01) |
| *G02B 26/12* | (2006.01) |
| *G02B 27/30* | (2006.01) |
| *G02F 1/29* | (2006.01) |

(52) U.S. Cl.
CPC .......... *G01S 7/4814* (2013.01); *G01S 7/4817* (2013.01); *G01S 17/89* (2013.01); *G02B 26/12* (2013.01); *G02B 27/30* (2013.01); *G02F 1/294* (2021.01)

(58) Field of Classification Search
CPC .... G01S 7/4814; G01S 7/4815; G01S 7/4817; G01S 17/89; G02F 1/294; G02B 26/12; G02B 27/30
See application file for complete search history.

(56) References Cited

U.S. PATENT DOCUMENTS

| | | | | |
|---|---|---|---|---|
| 8,213,022 B1 * | 7/2012 | Riza | ..................... | G01B 11/026 |
| | | | | 359/290 |
| 8,417,121 B2 * | 4/2013 | Britz | ..................... | H04B 10/25 |
| | | | | 398/208 |
| 11,221,488 B1 * | 1/2022 | Kangas | .................. | G02F 1/294 |
| 12,001,065 B1 * | 6/2024 | Liu | ..................... | G02B 6/4212 |
| 2019/0258134 A1 * | 8/2019 | Chen | ................. | G01B 11/2513 |
| 2022/0206120 A1 * | 6/2022 | Lu | ........................... | G01S 17/08 |
| 2022/0244362 A1 * | 8/2022 | Shepard | ............... | G01S 7/4865 |
| 2024/0133679 A1 * | 4/2024 | Hamid Muhammed | ................... | |
| | | | | G06V 40/18 |

* cited by examiner

*Primary Examiner* — Yuqing Xiao
*Assistant Examiner* — Isabelle Lin Boegholm
(74) *Attorney, Agent, or Firm* — Womble Bond Dickinson (US) LLP

(57) ABSTRACT

A light detection and ranging (LIDAR) system includes a beam collimator, a plurality of first lenses, a plurality of tunable lenses, and one or more optical sources to generate a plurality of optical beams. Each tunable lens may be disposed adjacent a respective one of the plurality of first lenses such that the respective one of the plurality of first lenses is between the tunable lens and the beam collimator. Each of the plurality of optical beams may pass through one of the tunable lenses and one of the first lenses towards the beam collimator. Each of the plurality of tunable lenses may be separately controllable by selectively applying voltage to the tunable lens to adjust a focal length of the tunable lens to compensate for a variation in focus positions of the plurality of first lenses.

18 Claims, 11 Drawing Sheets

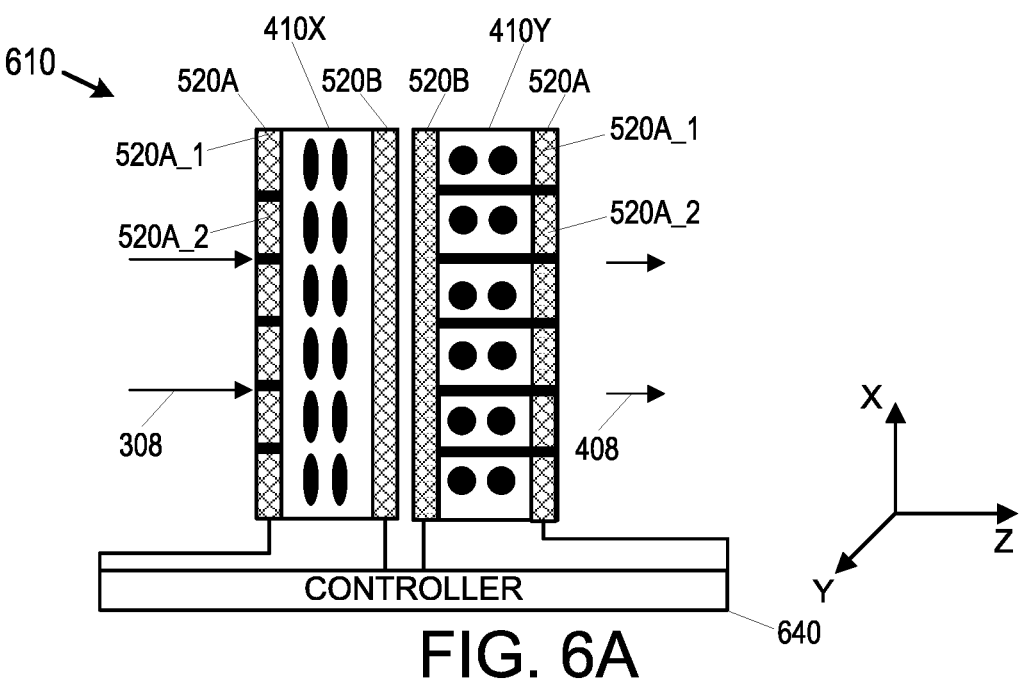
FIG. 6A
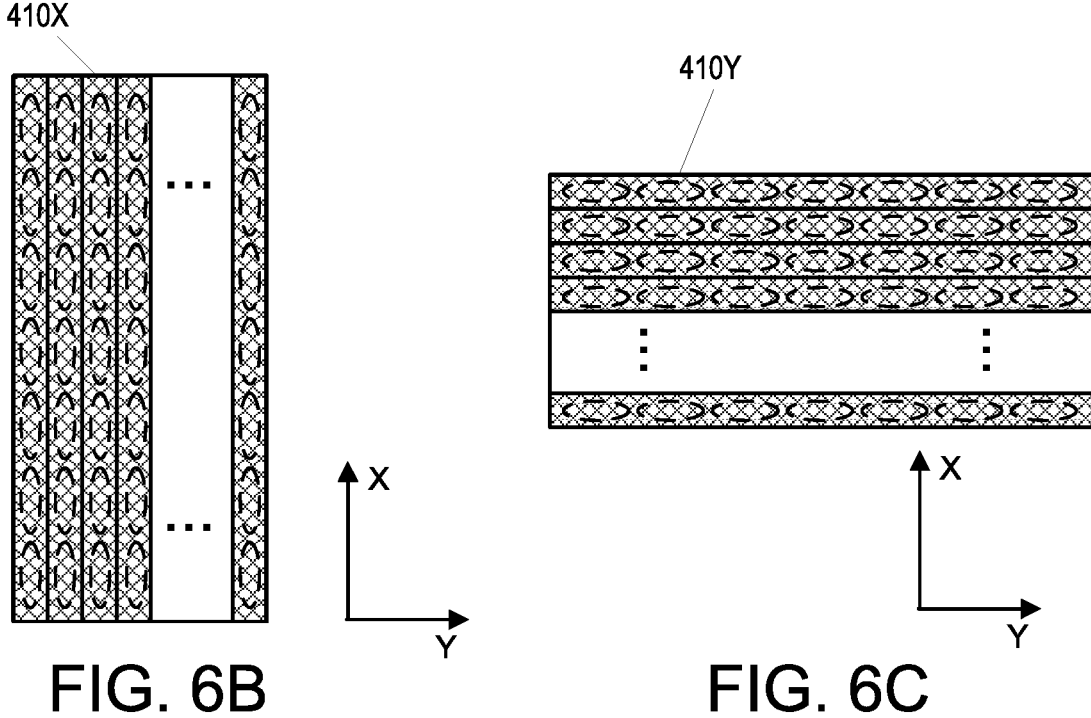
FIG. 6B                                   FIG. 6C

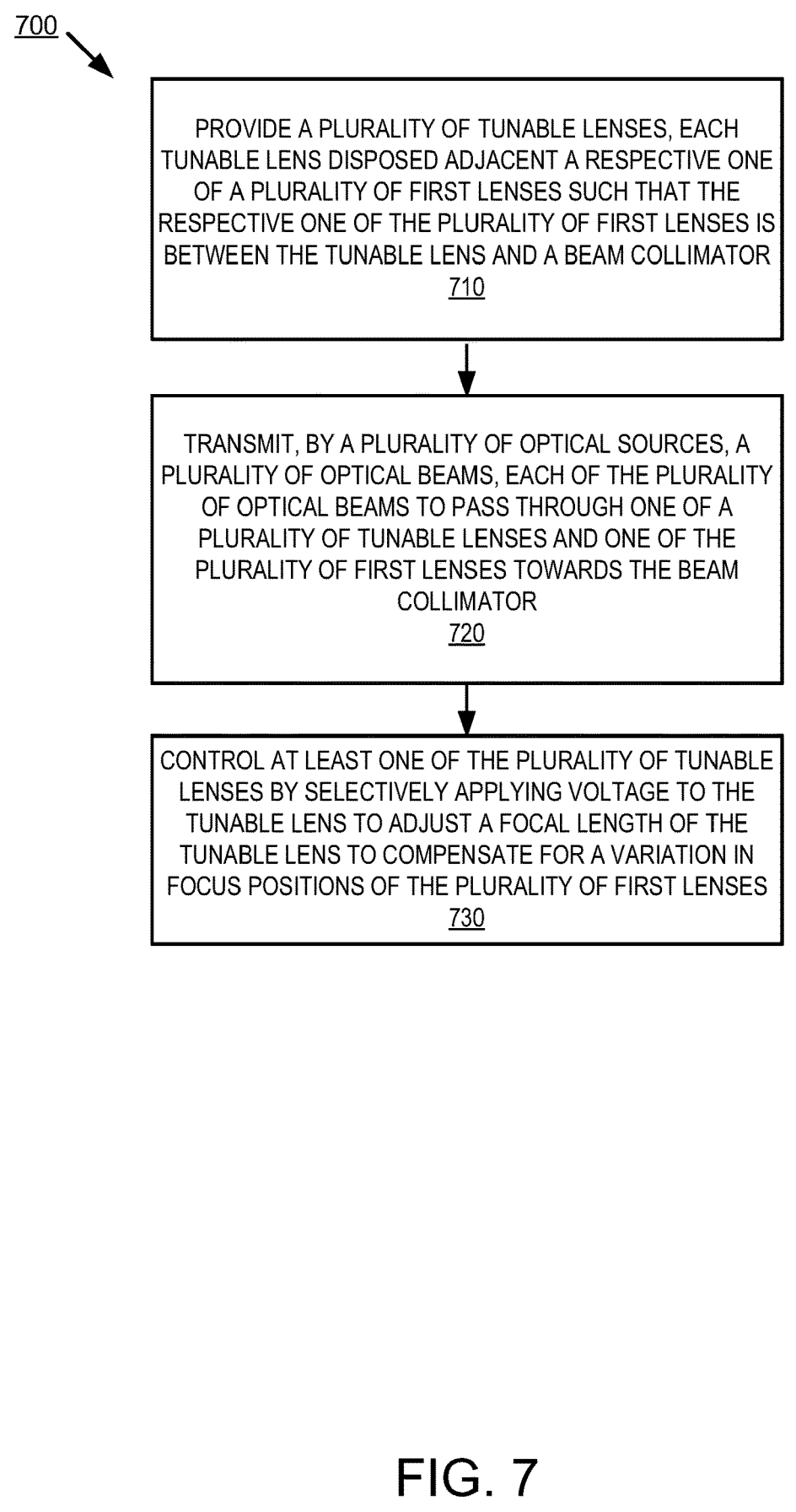

700

PROVIDE A PLURALITY OF TUNABLE LENSES, EACH TUNABLE LENS DISPOSED ADJACENT A RESPECTIVE ONE OF A PLURALITY OF FIRST LENSES SUCH THAT THE RESPECTIVE ONE OF THE PLURALITY OF FIRST LENSES IS BETWEEN THE TUNABLE LENS AND A BEAM COLLIMATOR
710

TRANSMIT, BY A PLURALITY OF OPTICAL SOURCES, A PLURALITY OF OPTICAL BEAMS, EACH OF THE PLURALITY OF OPTICAL BEAMS TO PASS THROUGH ONE OF A PLURALITY OF TUNABLE LENSES AND ONE OF THE PLURALITY OF FIRST LENSES TOWARDS THE BEAM COLLIMATOR
720

CONTROL AT LEAST ONE OF THE PLURALITY OF TUNABLE LENSES BY SELECTIVELY APPLYING VOLTAGE TO THE TUNABLE LENS TO ADJUST A FOCAL LENGTH OF THE TUNABLE LENS TO COMPENSATE FOR A VARIATION IN FOCUS POSITIONS OF THE PLURALITY OF FIRST LENSES
730

FIG. 7

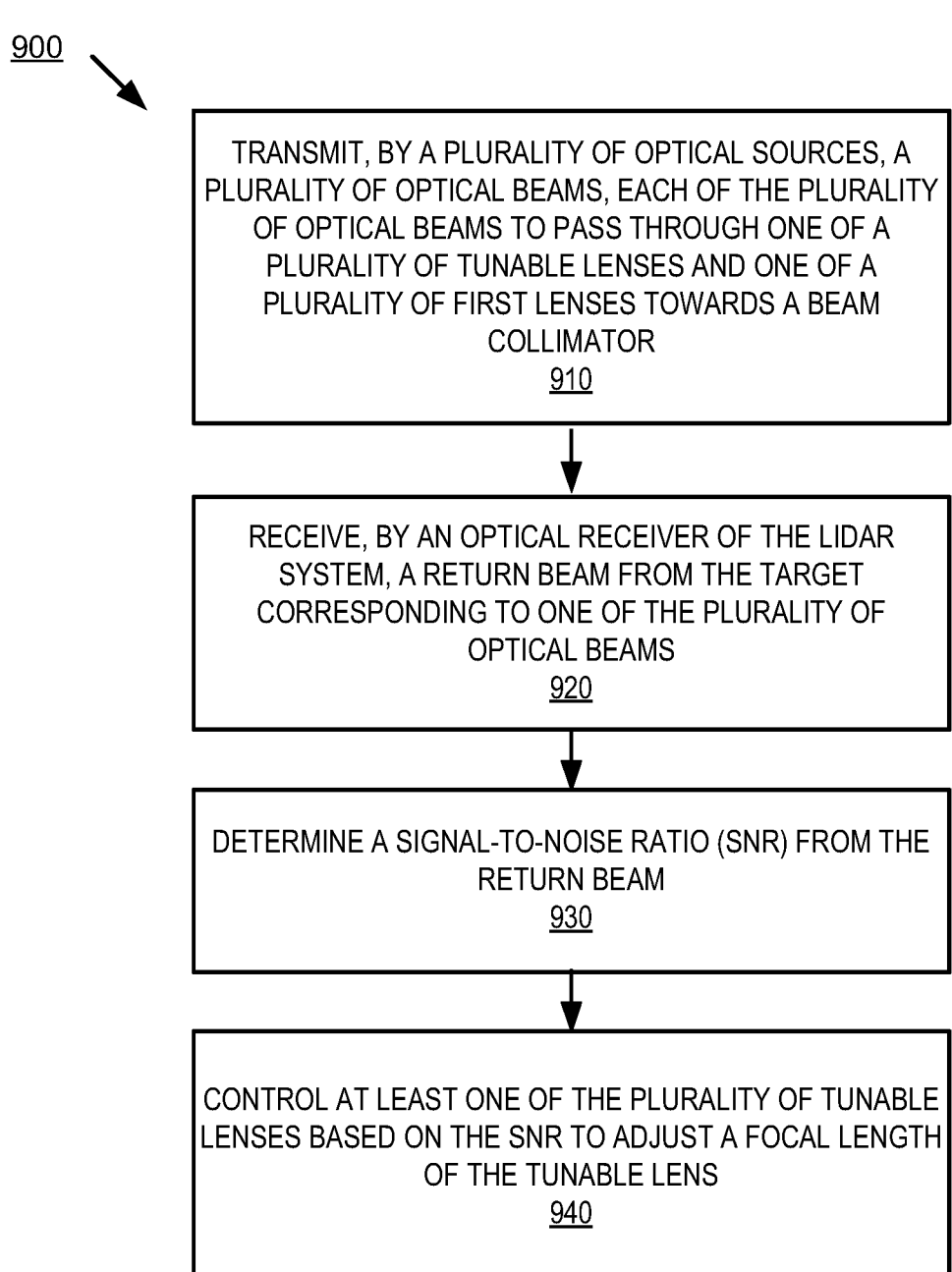

900

TRANSMIT, BY A PLURALITY OF OPTICAL SOURCES, A PLURALITY OF OPTICAL BEAMS, EACH OF THE PLURALITY OF OPTICAL BEAMS TO PASS THROUGH ONE OF A PLURALITY OF TUNABLE LENSES AND ONE OF A PLURALITY OF FIRST LENSES TOWARDS A BEAM COLLIMATOR
910

RECEIVE, BY AN OPTICAL RECEIVER OF THE LIDAR SYSTEM, A RETURN BEAM FROM THE TARGET CORRESPONDING TO ONE OF THE PLURALITY OF OPTICAL BEAMS
920

DETERMINE A SIGNAL-TO-NOISE RATIO (SNR) FROM THE RETURN BEAM
930

CONTROL AT LEAST ONE OF THE PLURALITY OF TUNABLE LENSES BASED ON THE SNR TO ADJUST A FOCAL LENGTH OF THE TUNABLE LENS
940

FIG. 9

TECHNIQUES FOR TUNABLE BEAM FOCUS COMPENSATION FOR MULTIPLE BEAM LIDAR SYSTEMS

FIELD OF INVENTION

The present disclosure is related to light detection and ranging (LIDAR) systems in general, and more particularly to focus alignment for optical beams in LIDAR systems.

BACKGROUND

Frequency-Modulated Continuous-Wave (FMCW) LIDAR systems use tunable lasers for frequency-chirped illumination of targets, and coherent receivers for detection of backscattered or reflected light from the targets that are combined with a local copy of the transmitted signal (LO signal). Conventional LIDAR systems require high frame rates and an increased number of scanning points typically achieved by using multiple numbers of optical sources to emit optical beams. The optical sources may be placed in a one-dimensional or two-dimensional array separated by some distance, referred to as pitch. The array of optical sources may share a collimator, which may consist of a single lens or multiple lenses. The single output lens provides angular separation between collimated optical beams to create discrete lines after reaching the scanner of the LIDAR system.

BRIEF DESCRIPTION OF THE DRAWINGS

For a more complete understanding of the various examples, reference is now made to the following detailed description taken in connection with the accompanying drawings in which like identifiers correspond to like elements.

FIGS. 6A to 6C illustrate details of a stacked tunable lens according to some embodiments of the present disclosure.

FIG. 7 is a flow diagram of a method for operating a LIDAR system, in accordance with some embodiments of the present disclosure.

FIG. 9 is a flow diagram of a method for operating a LIDAR system, in accordance with some embodiments of the present disclosure.

DETAILED DESCRIPTION

Figure 1:
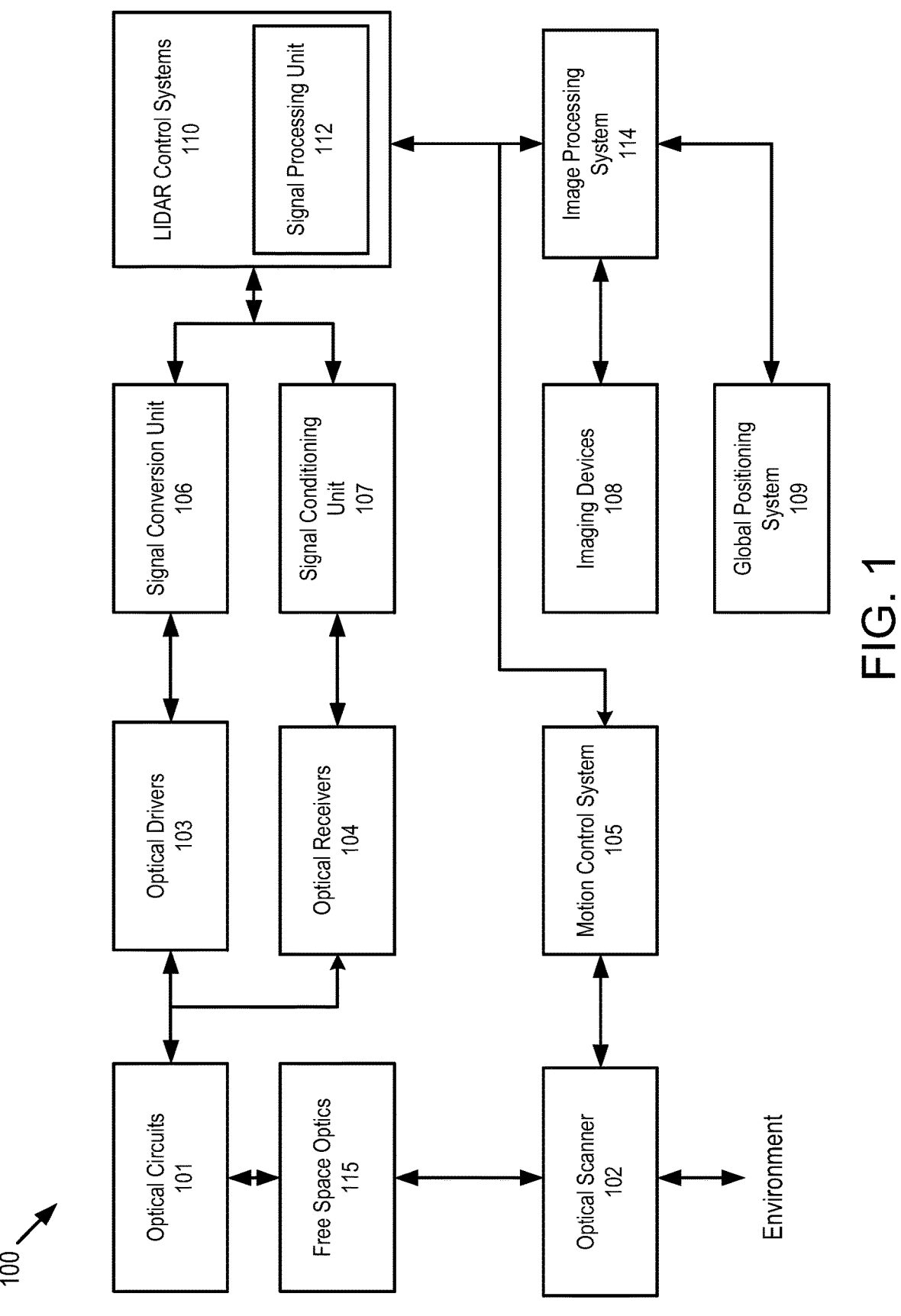
FIG. 1 is a block diagram of an example LIDAR system according to some embodiments of the present disclosure.

The present disclosure describes various examples of LIDAR systems and methods for detecting distance and relative speed of objects. More specifically, the present disclosure described improved techniques for performing measurement of distance and speed using multiple optical beams.

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the spirit and scope of the embodiments.

The present disclosure describes various examples of LIDAR systems and methods for optical beam focus adjustment. According to some embodiments, the described LIDAR system described herein may be implemented in any sensing market, such as, but not limited to, transportation, manufacturing, metrology, medical, virtual reality, augmented reality, and security systems. According to some embodiments, the described LIDAR system is implemented as part of a front-end of frequency-modulated continuous-wave (FMCW) device that assists with spatial awareness for automated driver assist systems, or self-driving vehicles.

As discussed above, conventional LIDAR systems require high frame rates and an increased number of scanning points. For example, for a large number of scanning lines per second, multiple optical beams may be used in a LIDAR system to allow for multiple lines to be scanned simultaneously. The LIDAR system may employ optics (e.g., free-space optics) to manage the multiple beams. In some example LIDAR optics used for multiple beams, arrayed lenses may be used to focus the multiple beams onto the front focal plane of a collimator (which may be a collimating lens) or other reference plane for beam collimation. In some scenarios, collimated beams may be transmitted into the open field for target scanning by scanning mirrors.

However, when collimating beams in an irregular array, due to tolerances, manufacturing imperfections may produce irregular patterns. For example, if optical beams travel along the z-axis, the optical beams, as they exit their respective optical sources, may not be aligned in the x-axis, the y-axis, and/or the z-axis, or have other imperfections in their beam characteristics that may benefit from correction. For example, the focal length may vary across the various lenses used in an array to focus the individual optical beams onto a reference plane of the collimating lens. As a result, some individual beams of the multiple beams may not be focused onto the front focal plane of the collimating lens or other reference plane. There may be wavefront variation among beams before the collimating lens in the array, which may cause beam focus position variation. A focus position variation among multiple beams may cause issues with optimizing the LIDAR performance for all beams at the same time since each beam's focus may have a slight offset with respect to other ones of the beams to the collimating lens. There is another potential focus variation on the reference plane, which can be caused by the collimator itself, such as when the collimator is, or includes, a lens stack. In these scenarios, the lens stack may consist of multiple lenses, and these lenses may not be perfectly aligned with each other. In this situation, a precommencer (e.g., a pre-compensation apparatus) may be used, and the focus of each beam may be intentionally adjusted to be off from the reference plane to compensate the effect caused by the lens stack.

The present disclosure solves the above issues associated with optical beam focus alignment and correction by using an array of liquid crystal (LC) cells as a gradient index lens for one or more of the multiple output beams to compensate for the focus variation. The LC cells can be electrically controlled. By applying different voltages, the index of a lens formed of an LC cell can be changed monotonically to form a lens with varied focusing power. Each beam focus position can be fine-tuned by each LC lens so that focus positions of all beams can be aligned on a same reference plane for the collimator or to compensate for the collimator's focus variation across the reference plane.

In some embodiments, the LC lens may be formed as a cylindrical one-dimensional (1-D) lens. On a single LC cell, it may be more cost-effective to fabricate a cylindrical 1-D lens as compared to aspherical or spherical two-dimensional (2-D) lens. In some embodiments, two stacked cylindrical LC lenses with a perpendicular axis may be used to form an equivalent 2-D lens. A lens formed from two stacked cylindrical lenses also has the advantage of compensating for astigmatism, e.g., a different focus in x and y directions. In addition, fabrication of the stacked cylindrical lens may be relatively less complex layout to arrange in an array. In some embodiments, the thickness of the LC (which may include an LC cell and additional substrates) may be on the order of tens of micrometers, and the tunable optical focusing power can be up to several diopters for both positive focusing and negative focusing (diverging).

FIG. 1 is a block diagram of an example LIDAR system 100 according to some embodiments of the present disclosure. The LIDAR system 100 includes one or more of each of a number of components, but may include fewer or additional components than shown in FIG. 1. As shown, the LiDAR system 100 includes optical circuits 101 implemented on a photonics chip. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LIDAR control systems 110 may include a signal processing unit 112 such as a DSP. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, which may be a modulated optical signal. The reflected beam may be mixed with a second signal from a local oscillator. The optical receivers 104 may include a high-speed analog-to-digital converter to convert signals from the target receiver to signals interpretable by the LiDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct the optical drivers 103 to independently modulate one or more optical beams, and these modulated signals propagate through the passive optical circuit to a collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LIDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 2:
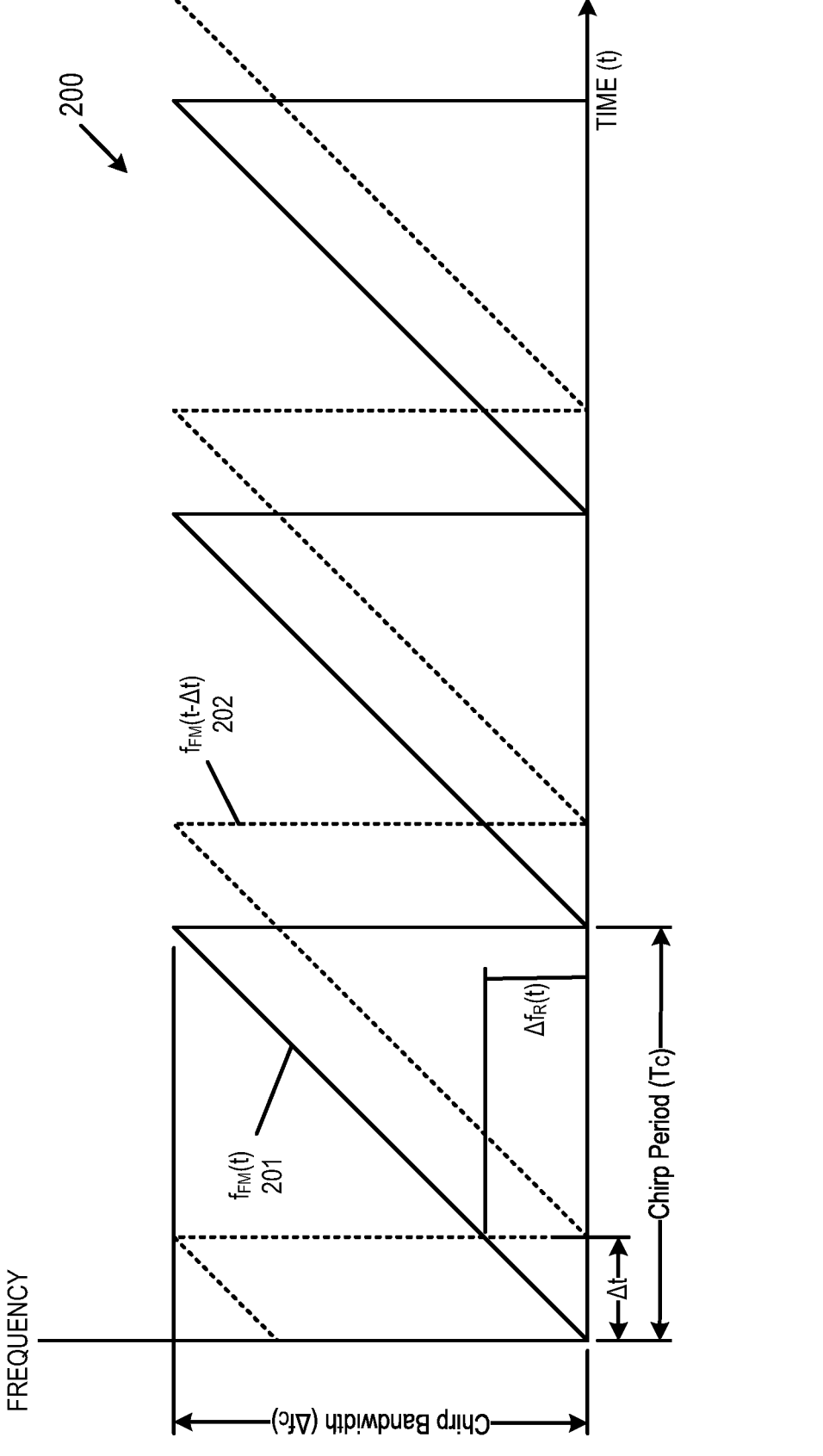
FIG. 2 is a time-frequency diagram of FMCW scanning signals that can be used by a LiDAR system according to some embodiments of the present disclosure.

FIG. 2 is a time-frequency diagram of FMCW scanning signals that can be used by a LIDAR system according to some embodiments of the present disclosure. The FMCW scanning signals 200 and 202 may be used in any suitable LIDAR system, including the LIDAR system 100 of FIG. 1, to scan a target environment. The scanning signal 200 may be a triangular waveform with an up-chirp and a down-chirp having a same bandwidth $\Delta f_s$ and period $T_s$. The other scanning signal 202 is also a triangular waveform that includes an up-chirp and a down-chirp with bandwidth $\Delta f_s$ and period $T_s$. However, the two signals are inverted versions of one another such that the up-chirp on scanning signal 200 occurs in unison with the down-chirp on scanning signal 202.

FIG. 2 is a time-frequency diagram 200 of an FMCW scanning signal 201 that may be used by a LIDAR system, such as the LIDAR system 100, to scan a target environment according to some embodiments. In one example, the FMCW scanning signal 201, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$. FIG. 2 also depicts target return signal 202 according to some embodiments. Target return signal 202, labeled as $f_{FM}(t-\Delta t)$, is a time-delayed version of the FMCW scanning signal 201, where $\Delta t$ is the round trip time to and from a target illuminated by FMCW scanning signal 201. The round trip time is given as $\Delta t=2R/v$, where R is the target range and v is the velocity of the optical beam, which is the speed of light c. The target range, R, can therefore be calculated as $R=c(\Delta t/2)$. When the target return signal 202 is optically mixed with the scanning signal, a range dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of LIDAR system 100. The beat frequency $\Delta f_R(t)$ can then be digitized by an analog-to-digital converter (ADC), for example, in a signal conditioning unit such as signal conditioning unit 107 in the LIDAR system 100. The digitized beat frequency signal can then be digitally processed, for example, in a signal processing unit, such as signal processing unit 112 in the LIDAR system 100. It should be noted that the target return signal 202 will, in general, also include a frequency offset (Doppler shift) if the target has a velocity relative to the LIDAR system 100. The Doppler shift can be determined separately, and used to correct the frequency of the return signal 202, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_R$max) is 500 megahertz. This limit in turn determines the maximum range of the system as $Rmax=(c/2)(\Delta f_R max/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3:
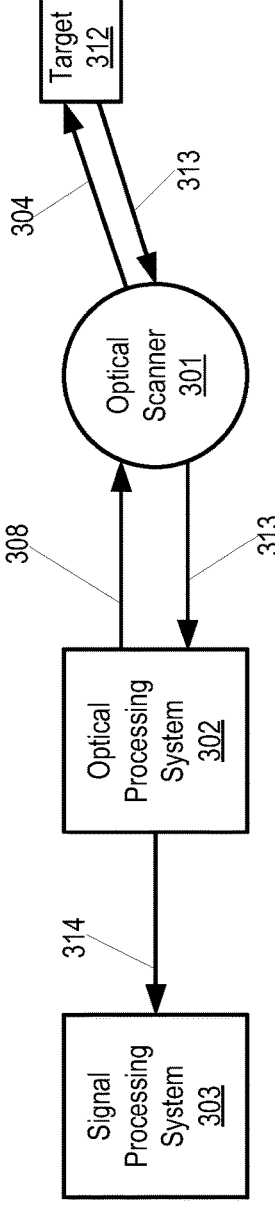
FIG. 3 is a block diagram illustrating an example LIDAR system according to some embodiments of the present disclosure.

FIG. 3 is a block diagram illustrating an example LIDAR system 300 according to some embodiments of the present disclosure. Example system 300 includes an optical scanner 301 to transmit a frequency-modulated continuous wave optical scanning beam 304 to targets such as target 312 and to receive a return signal 313 from reflections of the optical scanning beam 304 from the targets in the field of view (FOV) of the optical scanner 301. LIDAR system 300 also includes an optical processing system 302 to generate a baseband signal 314 in the time domain from the return signal 313, where the baseband signal 314 contains frequencies corresponding to LIDAR target ranges. Optical processing system 302 may include elements of free space optics 115, optical circuits 101, optical drivers 103 and optical receivers 104 in LIDAR system 100. LIDAR system 300 also includes a signal processing system 303 to measure energy of the baseband signal 314 in the frequency domain, to compare the energy to an estimate of LIDAR system noise, and to determine a likelihood that a signal peak in the frequency domain indicates a detected target. Signal processing system 303 may include elements of signal conversion unit 106, signal conditioning unit 107, LIDAR control systems 110 and signal processing unit 112 in LIDAR system 100.

In some embodiments, optical scanner 301 is configured to scan a target environment with the optical scanning beam 304 through a range of azimuth and elevation angles covering the field of view (FOV) of the LIDAR system 300. In some embodiments, the optical scanning beam 304 may include a plurality of individual optical beams 308 that are collimated together and directed to optical scanner 301 to generate the scanning beam 304. The plurality of optical beams 308 may allow for a plurality of scan points to be returned through the range of azimuth and elevation angles covered by the optical scanner 301. In order to collimate the plurality of optical beams 308, a beam collimator, such as a collimating lens, may be used to collimate individual ones of the optical beams 308 to generate the optical scanning beam 304.

Figures 4A, 4B:
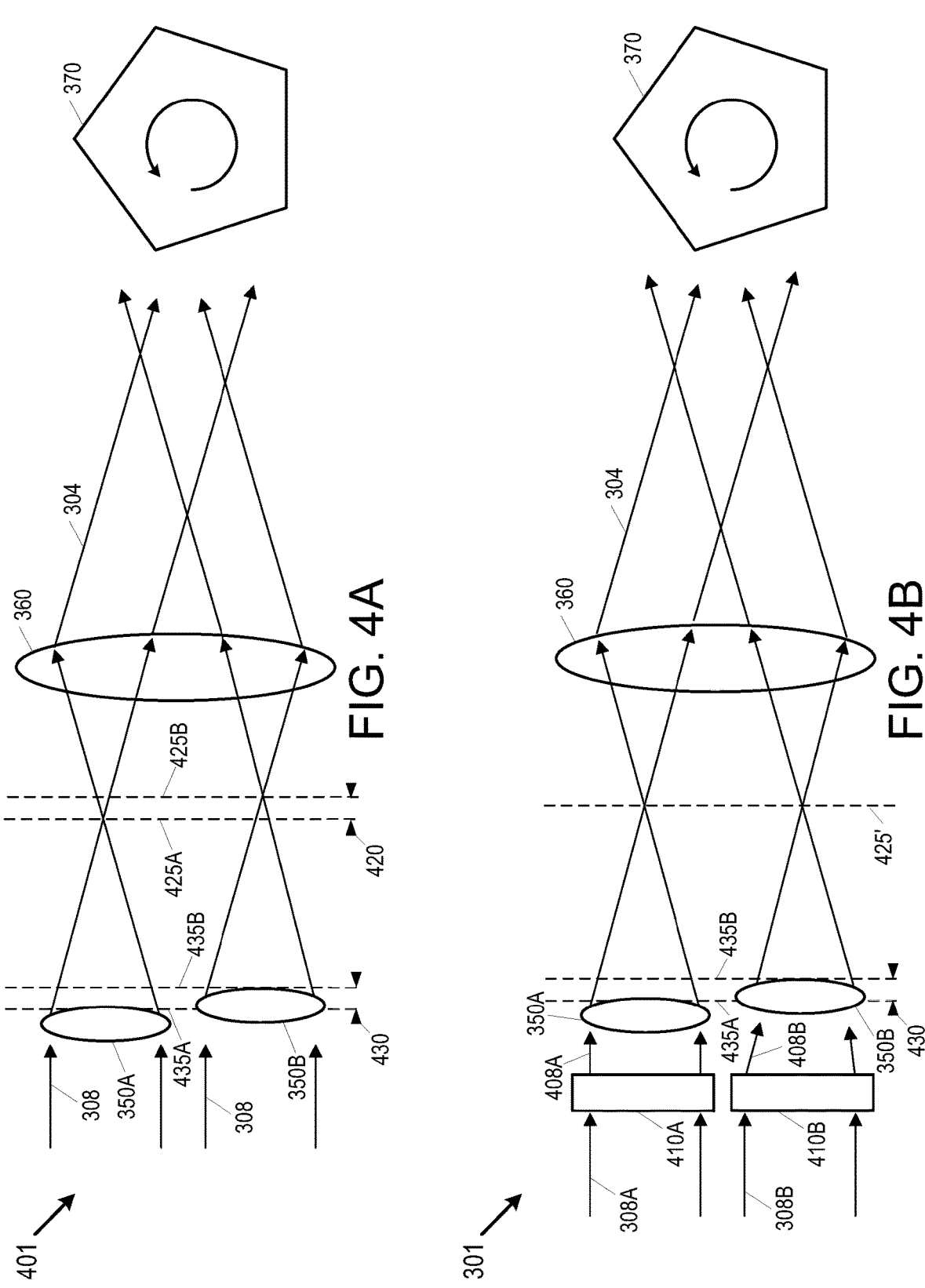
FIG. 4A illustrates challenges that can occur in LIDAR systems incorporating a plurality of optical scanning beams, as recognized by the embodiments of the present disclosure.
FIG. 4B illustrates an optical scanner incorporating tunable lenses, according to some embodiments of the present disclosure.

FIG. 4A illustrates challenges that can occur in LIDAR systems incorporating a plurality of optical scanning beams, as recognized by the embodiments of the present disclosure. Referring to FIG. 4A, a LIDAR system may include an optical scanner 401 incorporating a plurality of optical beams 308. The optical beams 308 (such as those generated by optical circuits 101 of FIG. 1) may be directed to a plurality of lenses 350 (also referred to herein as first lenses and/or focus lenses). The plurality of lenses 350, for example, may be part of free space optics 115 of FIG. 1 and/or the optical scanner 301 of FIG. 3.

FIG. 4A and the other figures may use like reference numerals to identify like elements. A letter after a reference numeral, such as "350A," indicates that the text refers specifically to the element having that particular reference numeral. A reference numeral in the text without a following letter, such as "350," refers to any or all of the elements in the figures bearing that reference numeral.

The lenses 350 may respectively focus the optical beams 308 onto beam collimator 360, which may be a collimator lens 360. In some embodiments, the collimator lens 360 may be a single lens element or multiple lens elements forming a stack (e.g., as in a camera). The beam collimator 360 may collimate the plurality of optical beams 308 into a collimated scanning beam 304 that may be directed to a scanning mirror 370. The scanning mirror 370 may direct the collimated beam 304 over the field of view (FOV) of the LIDAR system to illuminate one or more targets in the FOV. The scanning mirror 370 may be configured to traverse the scanning beam 304 through a range of azimuth and elevation angles covering the FOV. Though only a single plane of rotation is illustrated in FIG. 4A, it will be understood that the scanning mirror 370 and/or other optics may cover multiple planes for scanning the FOV.

The use of the plurality of optical beams 308, as collimated into the scanning beam 304 may provide a plurality of scan lines to the LIDAR system. This may allow for an increased number of line scans simultaneously, which may improve the amount of information that can be retrieved and/or detected by the LIDAR system. In some embodiments, one focusing lens 350 may be provided for one or more of the plurality of optical beams 308. Thus, a plurality of lenses 350 may be used to focus the optical beams 308 on the beam collimator 360 when multiple scan lines are desired for the LIDAR system.

The plurality of lenses 350 may be provided in a lens array. For example, in FIG. 4A two focus lenses 350 are illustrated, a first lens 350A and a second lens 350B. The first and second lenses 350A, 350B may be arranged adjacent one another, such as in a row or column format. In some embodiments, the lenses 350 may be placed and/or manufactured as part of a lens array.

As illustrated in FIG. 4A, in a practical implementation of a lens array, there may be some variation in the physical positioning of the lenses 350. For example, as illustrated in FIG. 4A, a first position 435A of a front of the first lens 350A may vary in one or more planes with respect to a second position 435B of a front of the second lens 350B. This may result in an offset 430 between the transmitting surfaces (e.g., a front of the lenses 350) of the first and second lenses 350A, 350B. The offset may be an unintentional by-product of manufacturing tolerances of the arrangement of the lenses 350. For example, a lens array containing the first and second lenses 350A, 350B may be designed such that the first and second lenses 350A, 350B are coplanar, but normal variations due to limitations on the precision of manufacturing devices may result in an offset 430 between the first and second lenses 350A, 350B. In FIG. 4A, the offset 430 is shown in a particular direction (e.g., a horizontal direction) but it will be understood that this is only for example purposes, and other types of deviations in the positioning of the lenses 350 may occur within the scope of the present disclosure.

The offset 430 may be non-uniform across the lens array. For example, an offset 430 between the first and second lenses 350A, 350B may be different than an offset 430 between the first and second lenses 350A, 350B and other lenses of the lens array. Because the offset 430 is unintentional, it may be difficult to eliminate and/or predict the offset 430 completely.

Due to the physical offset 430, differences in the focal planes 425 of the lenses 350 may emerge. For example, referring to FIG. 4A, the first lens 350A may have a first focal plane 425A, and the second lens 350B may have a second focal plane 425B. A focal plane of a lens 350 is a plane that is perpendicular to the axis of the lens 350 that passes through the point of focus of the lens 350. The first focal plane 425A of the first lens 350A may be offset from the second focal plane 425B of the second lens 350B by an offset 420.

When there is an offset 420 between the focal planes 425 of the lenses 350, the multiple beams 308 may not be focused onto the front focal plane of the beam collimator 360 or other reference plane. The focus position variation among multiple beams 308 may cause issues with optimizing the LiDAR performance for all of the optical beams 308 at the same time to generate the scanning beam 304, since each beam's focus has a slight offset to the beam collimator 360.

In FIG. 4A, the offset 420 between the focal planes 425 of the lenses 350 is due to the physical offset 430 of the lenses. However, this is not the only possible cause for such a focal plane offset 420. In some embodiments, the focal plane offset 420 between the lenses 350 may be alternatively or additionally caused by manufacturing defects of the lenses 350 or the beam collimator 360 (e.g., as a lens stack) themselves. In some embodiments, the focal plane offset 420 between the lenses 350 may be alternatively or additionally caused by wavefront variations in the input beams 308. Thus, embodiments of the present disclosure are not limited to configurations in which the lenses 350 are misaligned, but are generally applicable, at least, to configurations in which one or more conditions of the LIDAR system has resulted in a focal plane offset 420 between the focusing lenses 350 or the beam collimator 360 (e.g., as a lens stack).

Embodiments of the present disclosure address these and other problems by utilizing a tunable lens that allows for individual focus control for respective ones of the plurality of beams 308. FIG. 4B illustrates an optical scanner 301 incorporating tunable lenses 410, according to some embodiments of the present disclosure. A description of elements of FIG. 4B that have been previously described will be omitted for brevity.

Referring to FIG. 4B, a plurality of focusing lenses 350 may be provided, e.g., as a part of a lens array. The focusing lenses 350 may include a first lens 350A and a second lens 350B. In some embodiments, the first and second lenses 350A, 350B may have transmitting surfaces that are physically offset from one another, such as due to manufacturing tolerances. For example, as illustrated in FIG. 4B, a first position 435A of a front of the first lens 350A may vary in one or more planes with respect to a second position 435B of a front of the second lens 350B, resulting in an offset 430 between the transmitting surfaces (e.g., a front of the lenses 350) of the first and second lenses 350A, 350B. Though only two lenses 350 are illustrated in FIG. 4B, it will be understood that more lenses 350 may be provided, in a variety of physical configurations and/or layouts.

A plurality of tunable lenses 410 may be provided before respective ones of the focusing lenses 350. For example, a first tunable lens 410A may be placed in front of the first lens 350A and a second tunable lens 410B may be placed in front of the second lens 350B. The tunable lenses 410 may be placed such that they intercept the respective optical beam 308 being transmitted to the respective lens 350.

The tunable lenses 410 may be individually controllable so as to alter a path of the beam 308 being passed to the focusing lens 350. As used herein, a tunable lens 410 may refer to a lens 410 that is electrically and/or automatically controllable to provide varying levels of converging or diverging power to the lens 410. Each of the tunable lenses 410 may be separately (e.g., independently) controllable from other ones of the tunable lenses 410. For example, the first tunable lens 410A may be controllable to adjust the first tunable lens 410A to focus or diverge a first optical beam 308A to generate a first intermediate beam 408A that is transmitted to the first lens 350A. Similarly, the second tunable lens 410B may be controllable to adjust the second tunable lens 410B to focus or diverge a second optical beam 308B to generate a second intermediate beam 408B that is transmitted to the second lens 350B.

The first and second tunable lenses 410A, 410B may be individually controlled to adjust the optical beam transmitted to the first and second focusing lenses 350A, 350B to align a focal plane 425' of the first and second focusing lenses 350A, 350B. For example, the first and second tunable lenses 410A, 410B may be individually controlled to generate first and second intermediate beams 408A, 408B so that the output of the first and second focusing lenses 350A, 350B are focused to a common focal plane 425' despite the positions of the first and second focusing lenses 350A, 350B having a physical offset 430 from one another.

In some embodiments, the common focal plane 425' may be achieved by altering one or more of the tunable lenses 410 to adjust the focal plane of one or more of the focusing lenses 350 by varying the input beam 308 to generate the intermediate beam 408. For example, in some embodiments, either the first tunable lens 410A may be adjusted to generate a first intermediate beam 408A for transmission to the first focusing lens 350A. The first tunable lens 410A may alter a path and/or characteristic of the first optical beam 308A to form the first intermediate beam 408A. The alteration may result in the first intermediate beam 408A having a path that results in a common focal plane 425' when the first intermediate beam 408A passes through the first focusing lens 350A. In some embodiments, the first tunable lens 410A may alter a path and/or characteristic of the first optical beam 308A to form the first intermediate beam 408A while the second tunable lens 410B transmits the first optical beam unchanged, but the embodiments of the present disclosure are not limited thereto. In some embodiments, both the first tunable lens 410A and the second tunable lens 410B may alter respective paths and/or characteristics of the first and second optical beams 308A, 308B to form the first and second intermediate beams 408A, 408B that result in a common focal plane 420'. Stated another way, the tunable lenses 410 may be individually controlled in multiple ways to focus the input beams 308 on a common focal plane 420'.

Through the use of the tunable lenses 410, the common focal plane 425' may be achieved across the lenses 350 of the optical scanner 301. The common focal plane 425' may result in a reduction and/or elimination of a focal position variation among the multiple beams 308 provided to the beam collimator 360. With the common focal plane 425', the information provided by the LIDAR system may be more accurate and a larger amount of high-quality data may be achieved.

As discussed herein, the tunable lenses 410 may be useful to remediate a variation from a common focal plane 425' resulting from a physical offset 430 between the lenses, but the embodiments are not limited to only that cause. The tunable lenses 410 may provide greater flexibility in tuning the optical beams 308 of the LIDAR system under a number of different conditions. For example, the tunable lenses 410 may be used to offset wavefront variations in the optical beams 308. As another example, the tunable lenses 410 may be used to offset variations in the lenses 350 themselves or the beam collimator 360. As another example, the tunable lenses 410 may be used to offset variations in the output caused by operating conditions, such as temperature, humidity, and the like.

FIGS. 5A to 5D illustrate examples of a tunable lens 410 according to some embodiments of the present disclosure. A description of elements of FIGS. 5A to 5D that have been previously described will be omitted for brevity.

Figure 5A:
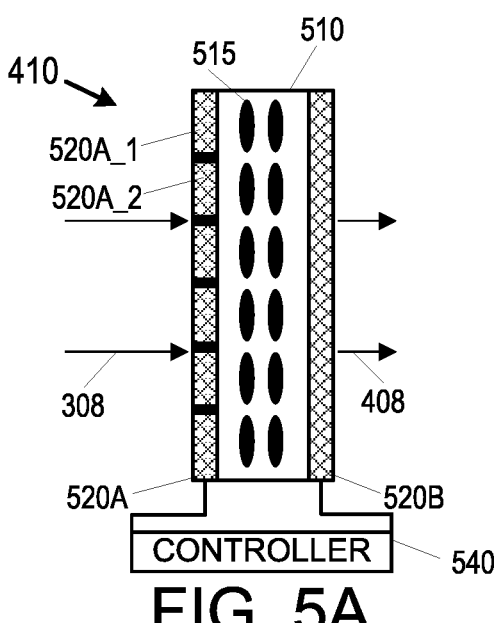
FIGS. 5A to 5D illustrate details of a tunable lens according to some embodiments of the present disclosure.

Referring to FIG. 5A, the tunable lens 410 may incorporate a liquid crystal (LC) layer 510 incorporating liquid crystal molecules 515. The liquid crystal layer 510 may be an LC substrate, and may include one or more liquid crystal technologies as known in the art, such as, for example, ECB (electrically controlled birefringence) liquid crystal, TN (twisted nematic) liquid crystal, VA (vertically aligned) liquid crystal, IPS (in-plane switching) liquid crystal, OCB (optically compensated bend) liquid crystal, and the like. The LC layer 510 may have a thickness on the order of 10-100 micrometers, as an example, though the embodiments of the present disclosure are not limited thereto. The illustrated arrangement of the LC layer 510 in FIG. 5A, including the LC molecules 515, is schematic for the purpose of illustrating the operation of some embodiments of the present disclosure, and is not intended to limit the embodiments of the present disclosure.

The liquid crystal layer 510 may be disposed between conductive layers 520. In some embodiments, the conductive layers 520 may be indium tin oxide (ITO), though the embodiments of the present disclosure are not limited thereto. The conductive layers 520 may be optically transparent. In some embodiments, a first conductive layer 520A may be pixelated (e.g., separated into segments capable of being electrically isolated from one another) to form pixels on the LC layer 510. For example, a pixel 520A_1 may be capable of receiving an electronic signal that is different from that of another pixel 520A_2. In some embodiments, a second conductive layer 520B may be a common conductor (e.g., a ground connection), though the embodiments of the present disclosure are not limited thereto. In some embodiments, the LC layer 510 and the conductive layers 520 may be further disposed between transparent layers, such as glass, though this is not illustrated in FIG. 5A for ease of description.

The molecules 515 of the LC layer 510 may have a predetermined arrangement due to an alignment layer and/or intrinsic properties of the LC layer 510. The arrangement of the molecules 515 of the LC layer 510 may be changed if an electric field is applied thereto due to an optical anisotropic property of the LC layer 510. A phase retardation of light passing through the LC layer 510 may vary according to an arrangement state of the molecules 515 of the LC layer 510. As a result, by controlling an electric field applied to the LC layer 510 (and thus altering the arrangement of the molecules 515), a phase retardation of light passing through the LC layer 510 may be adjusted and/or controlled.

Figure 5B:
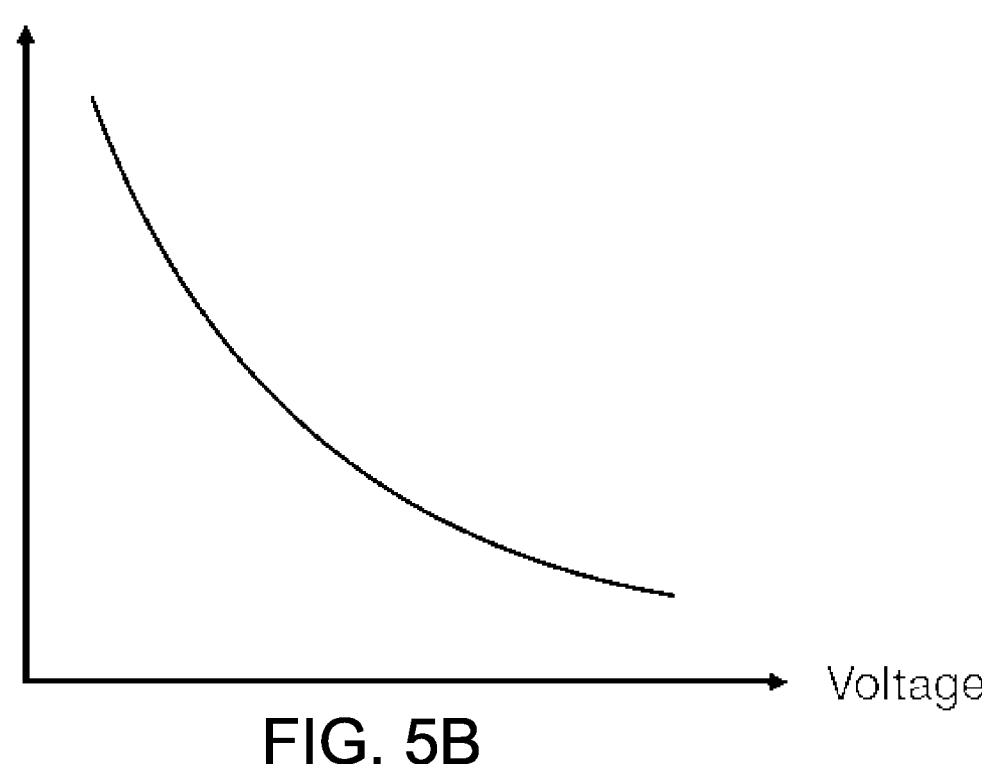

For example, a schematic graph of phase retardation of light passing through the LC layer 510 as a function of the electric field (voltage) on the LC layer 510 is illustrated in FIG. 5B. For low values of voltage, the phase retardation of light passing through the LC layer 510 is relatively high. For higher values of voltage applied to the LC layer 510, the phase retardation is relatively small. Example of the principles of operation of the tunable lens 410 are illustrated in schematic diagrams FIGS. 5C and 5D.

In some embodiments, the phase retardation $\varphi(x)$ of light passing through the LC layer 510 may be given by the equation:

$$\varphi(x) = Bx^2 + C,$$

where B and C are constants. Referring to FIGS. 5A to 5D, a focusing (converging) lens may be formed from the tunable lens 410 in scenarios in which B is less than 0 (see FIG. 5C) while a diverging lens may be formed from the tunable lens 410 in scenarios in which B is greater than 0 (see FIG. 5D).

Figure 5C:
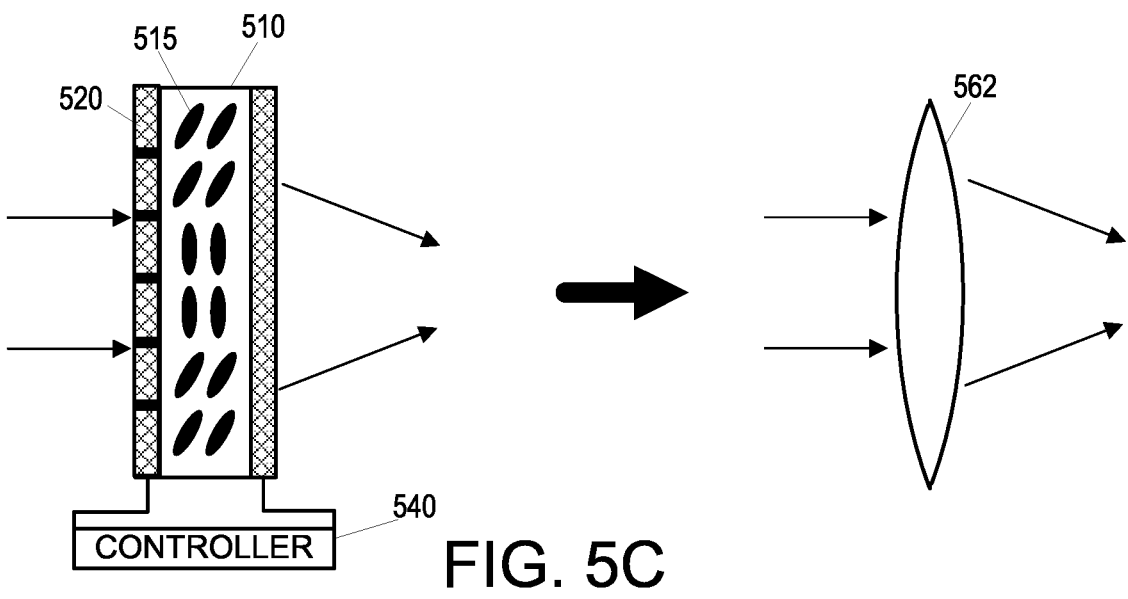
Figure 5D:
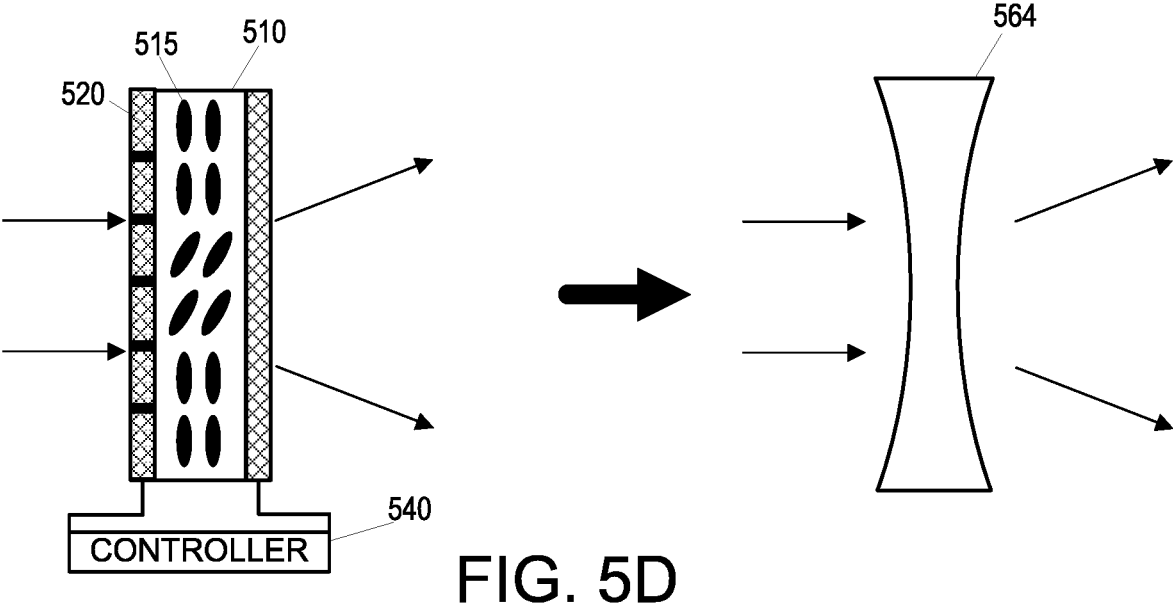

By controlling the electrical signal applied to the LC layer 510, the phase retardation of the material may be controlled to form a converging or diverging lens 410. For example, as illustrated in FIG. 5C, an electric signal may be applied to the LC layer 510 to increase a phase retardation at the center of the LC layer 510 so as to create a tunable lens 410 with focusing power (i.e., that acts/performs as a focusing lens 562). Similarly, as illustrated in FIG. 5D, an electric signal may be applied to the LC layer 510 to increase a phase retardation at the edges of the LC layer 510 so as to create a tunable lens 410 with diverging power (i.e., that acts/performs as a diverging lens 564). The use of pixels (e.g., pixels 520A_1, 520A_2) may allow for selective control of different portions of the tunable lens 410. If a voltage applied to the conductive layers 520 is substantially the same across the pixels, the phase retardation of the light passing through the LC layer 510 is the same across the length of the tunable lens 410. This may result in little to no variation in the light through the LC layer 510. If a voltage applied to the conductive layers 520 is different across the pixels, the phase retardation of the light passing through the LC layer 510 is varied across the length of the tunable lens 410. This may result in a tunable retardation variation in the light through the LC layer 510. The magnitude of the electrical signal may be adjusted (e.g., according to the phase retardation strength vs. voltage curve of FIG. 5B) across the various pixels to select not only whether the tunable lens 410 acts as a focusing or diverging lens, but also an associated strength of the converging/diverging power of the tunable lens 410. In some embodiments, the tunable lens 410 may be capable of adjusting the focusing power of the tunable lens 410 by 1 to 3 diopters, or more.

As illustrated in FIGS. 5C and 5D, electrical signals applied to the conductive layers 520 may be used to selectively alter the orientation of the molecules 515 in the LC layer 510. For example, an increased (or decreased) voltage may be applied to one portion of the LC layer 510 to alter a phase retardation of light passing through that portion of the LC layer 510 with respect to other portions of the LC layer 510. The orientation of the molecules 515 illustrated in FIGS. 5C and 5D are merely examples for purpose of illustration, and are not intended to limit the embodiments of the present disclosure.

In some embodiments, a controller 540 may be coupled to the conductive layers 520. The controller 540 may, in some embodiments, be an electronic circuit configured to apply signals (e.g., electrical signals) to the conductive layers 520 to control operation of the LC layer 510, and thus the operation of the tunable lens 410. For example, the controller 540 may be a field programmable gate array (FPGA), an application-specific integrated circuit (ASIC), a system on chip (SoC), a central processor unit (CPU), a network processor (NP), a digital signal processor (DSP), a micro controller unit (MCU), a programmable logic device (PLD), or another integrated chip.

The embodiments of the present disclosure are not limited to the configuration of FIGS. 5A to 5D. In some embodiments, a plurality of tunable lenses 410 may be combined. For example, for a single LC cell, it may be more effective to fabricate a cylindrical one-dimensional (1-D) lens compared to aspherical or spherical two-dimensional (2-D) lens. Some embodiments of the present disclosure may use two stacked cylindrical LC lenses with perpendicular axes to form an equivalent 2-D lens.

Embodiments incorporating stacked cylindrical lenses may have the advantages of compensating for astigmatism, e.g., having different focuses in the x and y planes. The fabrication of stacked LC tunable lenses 410 may be relatively less complex to arrange into a lens array, such as that which may be used in a multi-beam LIDAR system as described herein.

FIGS. 6A to 6C illustrate details of a stacked tunable lens 610 according to some embodiments of the present disclosure. A description of elements of FIGS. 6A to 6C that have been previously described will be omitted for brevity.

As illustrated in FIG. 6A, a stacked tunable lens 610 may incorporate a plurality of individual tunable lenses 410. For example, the stacked tunable lens 610 may include a first tunable lens 410_X and a second tunable lens 410_Y. The stacked tunable lens 610 may be configured such that light passing through the stacked tunable lens 610 passes through both the first tunable lens 410_X and the second tunable lens 410_Y. In some embodiments, the first tunable lens 410_X is configured to adjust a focal plane in a first plane (e.g., an x plane) of light passing through the first tunable lens 410_X. In some embodiments, the second tunable lens 410_Y is configured to adjust a focal plane in a second plane (e.g., a y plane) of light passing through the second tunable lens 410_Y. In some embodiments, the first plane may be orthogonal to the second plane, but the embodiments of the present disclosure are not limited thereto.

In some embodiments both the first and second tunable lenses 410_X, 410_Y may include conductive layers 520 (e.g., opposing electrodes 520A, 520B) that are pixelated (e.g., include pixels 520A_1, 520A_2). Because the first and second tunable lenses 410_X, 410_Y are configured to adjust the focal plane of light in different planes, the first and second tunable lenses 410_X, 410_Y may be separately controlled to adjust a focal plane in two dimensions of light passing through the stacked tunable lens 610.

The stacked tunable lens 610 may be formed by stacking the first tunable lens 410_X oriented in a first direction, as in FIG. 6B, onto the second tunable lens 410_Y, oriented in a second direction, as in FIG. 6C. In some embodiments, a same type of tunable lens 410 may be used for the first and second tunable lenses 410_X, 410_Y, but may be oriented orthogonally when stacking to form the stacked tunable lens 610. Though FIG. 6A illustrates a stacked tunable lens 610 formed of two tunable lenses (410X, 410Y), the embodiments of the present disclosure are not limited to such a configuration. In some embodiments, the number of tunable lenses 410 that are stacked may be three or more.

As with the tunable lens 410, the stacked tunable lens may be coupled to controller 640. The controller 640 may, in some embodiments, be an electronic circuit configured to apply signals (e.g., electrical signals) to the conductive layers 520 of both the first and second tunable lenses 410_X, 410_Y to control operation of the LC layers 510 thereof, and thus the operation of the stacked tunable lens 610. In some embodiments, the signals to the first tunable lens 410_X may be separately and/or independently controlled from those of the second tunable lens 410_Y. That is to say that the operation of different portions of the stacked tunable lens 610 may be separately controlled in multiple directions/planes.

The controller 640 may be a field programmable gate array (FPGA), an application-specific integrated circuit (ASIC), a system on chip (SoC), a central processor unit (CPU), a network processor (NP), a digital signal processor (DSP), a micro controller unit (MCU), a programmable logic device (PLD), or another integrated chip.

In FIG. 6A, the first and second tunable lenses 410X, 410Y are illustrated as separate devices, but the embodiments of the present disclosure are not limited to such a configuration. In some embodiments, the first and second tunable lenses 410X, 410Y may share one or more conductive layers 520. For example, referring to FIG. 6A, in some embodiments, the conductive layer 520B, as illustrated in FIG. 6A, may be a common layer between the first and second tunable lenses 410X, 410Y. For example, the conductive layer 520B of the first and second tunable lenses 410X, 410Y may be combined into a single conductive layer 520 as, for example, a common ground connection.

FIG. 7 is a flow diagram of a method 700 for operating a LIDAR system 300, in accordance with some embodiments of the present disclosure. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of the method 700 may be performed by a computing device (e.g., LIDAR control systems 110 illustrated in FIG. 1).

Referring simultaneously to the previous figures as well, the method 700 begins at block 710, in which a plurality of tunable lenses is provided, each tunable lens disposed adjacent a respective one of a plurality of first lenses such that the respective one of the plurality of first lenses is between the tunable lens and a beam collimator. In some embodiments, the tunable lens may be similar to tunable lens 410 and/or stacked tunable lens 610 described herein. The first lenses may be similar to the focusing lenses 350 and the beam collimator may be similar to beam collimator 360 described herein.

In some embodiments, one or more of the plurality of tunable lenses comprises a liquid crystal layer, such a LC layer 510 described herein. In some embodiments, the LIDAR system may include a controller configured to dynamically adjust one or more of the plurality of tunable lenses. In some embodiments, one or more of the plurality of tunable lenses is controllable to change from a converging lens to a diverging lens.

In some embodiments, at least one of the plurality of tunable lenses comprises a first portion to adjust the focal length of the tunable lens in a first plane and a second portion to adjust the focal length of the tunable lens in a second plane, such as in the stacked tunable lens 610 described herein. In some embodiments, the first portion may be separately controllable from the second portion.

At block 720, a plurality of optical beams may be transmitted, by a plurality of optical sources. Each of the plurality of optical beams may pass through one of a plurality of tunable lenses and one of the plurality of first lenses towards the beam collimator. In some embodiments, the optical beams may be similar to the optical beams 308 described herein. In some embodiments, each of the plurality of optical beams is to pass through the beam collimator towards a scanning mirror of the LIDAR system.

At block 730, at least one of the plurality of tunable lenses may be controlled by selectively applying voltage to the tunable lens to adjust a focal length of the tunable lens to compensate for a variation in focus positions of the plurality of first lenses. Controlling the tunable lens may be performed as described herein, for example, by applying a voltage to a conductive layer 520 to control operation of an LC layer 510. In some embodiments, the plurality of optical beams are transmitted towards a target, and the LIDAR system further comprises an optical receiver to receive a return beam from the target corresponding to one of the plurality of optical beams. In some embodiments, signal processing circuitry may determine at least one of a range or velocity of the target based on the return beam.

Figure 8:
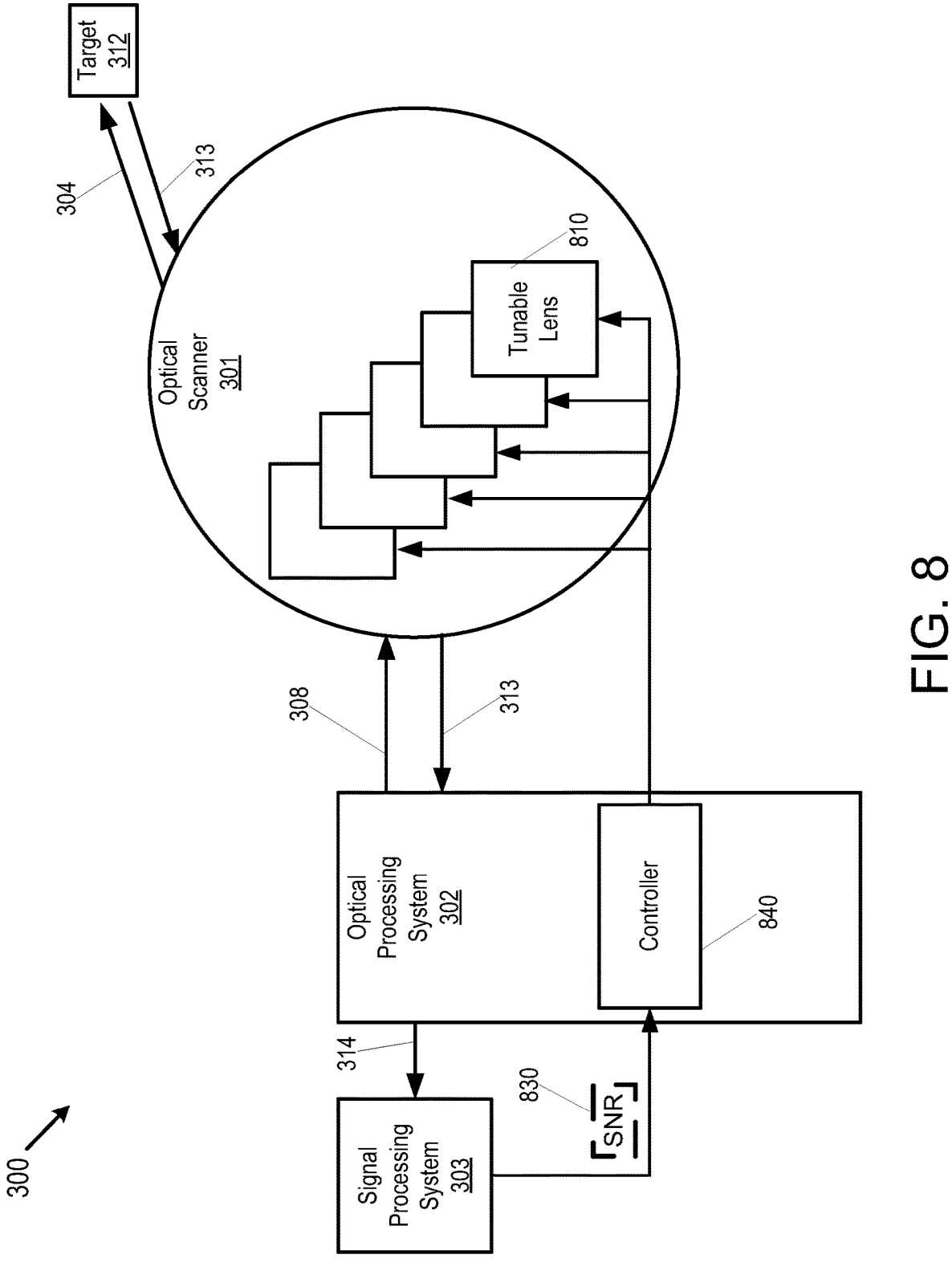
FIG. 8 is a block diagram illustrating an example of operating a LIDAR system according to some embodiments of the present disclosure.

In some embodiments, tunable lenses described herein (e.g., tunable lens 410 and/or stacked tunable lens 610) may be used to dynamically adjust the operation of a LIDAR system 300. FIG. 8 is a block diagram illustrating an example of operating a LIDAR system according to some embodiments of the present disclosure.

Referring to FIG. 8, the LIDAR system 300 may incorporate a plurality of the tunable lenses 810. The plurality of tunable lenses 810 may be similar to the tunable lenses 410 and/or the stacked tunable lenses 610 described herein and, as such, an operation thereof will not be described. For example, the optical scanner 301 may incorporate a plurality of focusing lenses (e.g., lenses 350 of FIG. 4B) and a beam collimator 360 (e.g., beam collimator of FIG. 4B). The tunable lenses 810 may be placed in front of (or behind) the focusing lenses to adjust a focal plane of the lenses.

In some embodiments, optical beams 308 of the LIDAR system 300 may pass through the focusing lenses and the tunable lenses 810 to be transmitted onto the FOV of the LIDAR system 300 as scanning beam 304. The scanning beam 304 may reflect from a target 312 to generate a return beam 313, which may be received by the LIDAR system 300.

The return beam 313 may be received by the optical processing system 302 and/or the signal processing system 303 (e.g. signal processing system 303 of FIG. 3). In some embodiments, the optical processing system 302 may analyze the return beam 313 to generate a baseband signal 314 in the time domain from the return signal 313, where the baseband signal 314 contains frequencies corresponding to LIDAR target ranges.

In some embodiments, the signal processing system 303 may analyze the return signal/beam 313 and/or the baseband signal 314 to determine a range/velocity of the target 312. In some embodiments, as part of processing the return signal/beam 313, the signal processing system 303 may determine a signal-to-noise ratio (SNR) 830 of the return signal/beam 313 and/or the baseband signal 314. The SNR 830 may determine a quality of the return signal/beam 313 and/or the baseband signal 314 (e.g., an ability of the return signal/beam 313 and/or the baseband signal 314 to provide useful information about the target 312).

In some embodiments, the SNR 830 may be transmitted to controller 840. The controller 840 may dynamically adjust the tunable lenses 810 responsive to the SNR 830. For example, in response to a degrading (e.g., decreasing) SNR 830, the controller 840 may dynamically control one or more of the tunable lenses 810 to attempt to increase the SNR 830.

For example, the controller 840 may adjust the focal plane of one or more of the tunable lenses 810 to adjust the scanning beam 304.

In some embodiments, the controller 840 may continually monitor the SNR 830 in a feedback loop to dynamically adjust the scanning beam 304 by controlling the tunable lenses 810 (e.g., by sending electrical signals to the conductive layers of the tunable lenses 810).

Though FIG. 8 illustrates that the controller adjusts the tunable lenses 810 responsive to the SNR 830, this is only an example, and is not intended to limit the embodiments of the present disclosure. In some embodiments, other information regarding the quality of scanning signal and/or beam 304, the return signal/beam 313, and/or the baseband signal 314 may be provided to the controller to indicate that the tunable lenses 810 should be adjusted.

By dynamically adjusting the tunable lenses 810, the controller 840 can improve and/or adjust the operation of the LIDAR system 300. For example, as the LIDAR system 300 ages, or as the environment of the LIDAR system 300 changes, the controller 840 can adjust the operation of the LIDAR system 300 to improve the quality of the scanning beam 304, or recover a degraded quality of the scanning beam 304, to maintain or improve the accuracy of the LIDAR system 300.

FIG. 9 is a flow diagram of a method 900 for operating a LIDAR system 300, in accordance with some embodiments of the present disclosure. Method 900 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of the method 900 may be performed by a computing device (e.g., LIDAR control systems 110 illustrated in FIG. 1 and/or signal processing system 303 and controller 840 of FIG. 8).

Referring simultaneously to the previous figures as well, the method 900 begins at block 910, in which a plurality of optical sources transmit a plurality of optical beams, each of the plurality of optical beams to pass through one of a plurality of tunable lenses and one of a plurality of first lenses towards a beam collimator. In some embodiments, the tunable lens may be similar to tunable lens 410 and/or stacked tunable lens 610 described herein. The first lenses may be similar to the focusing lenses 350 and the beam collimator may be similar to beam collimator 360 described herein. The optical beams may be similar to optical beams 308 described herein.

In some embodiments, one or more of the plurality of tunable lenses comprises a liquid crystal layer, such a LC layer 510 described herein. In some embodiments, the LIDAR system may include a controller configured to dynamically adjust one or more of the plurality of tunable lenses. In some embodiments, one or more of the plurality of tunable lenses is controllable to change from a converging lens to a diverging lens.

In some embodiments, at least one of the plurality of tunable lenses comprises a first portion to adjust the focal length of the tunable lens in a first plane and a second portion to adjust the focal length of the tunable lens in a second plane, such as in the stacked tunable lens 610 described herein. In some embodiments, the first portion may be separately controllable from the second portion.

At block 920, an optical receiver of the LIDAR system may receive a return beam from the target corresponding to one of the plurality of optical beams. The return beam and target may be similar to the return signal 313 and target 312, respectively, described herein. In some embodiments, signal processing circuitry may determine at least one of a range or velocity of the target based on the return beam.

At block 930, a signal-to-noise ratio (SNR) may be determined from the return beam. The SNR may be similar to SNR 830 described herein.

At block 940, at least one of the plurality of tunable lenses may be controlled based on the SNR to adjust a focal length of the tunable lens. Controlling the tunable lens may be performed as described herein, for example, by applying a voltage to a conductive layer 520 to control operation of an LC layer 510.

Figure 10:
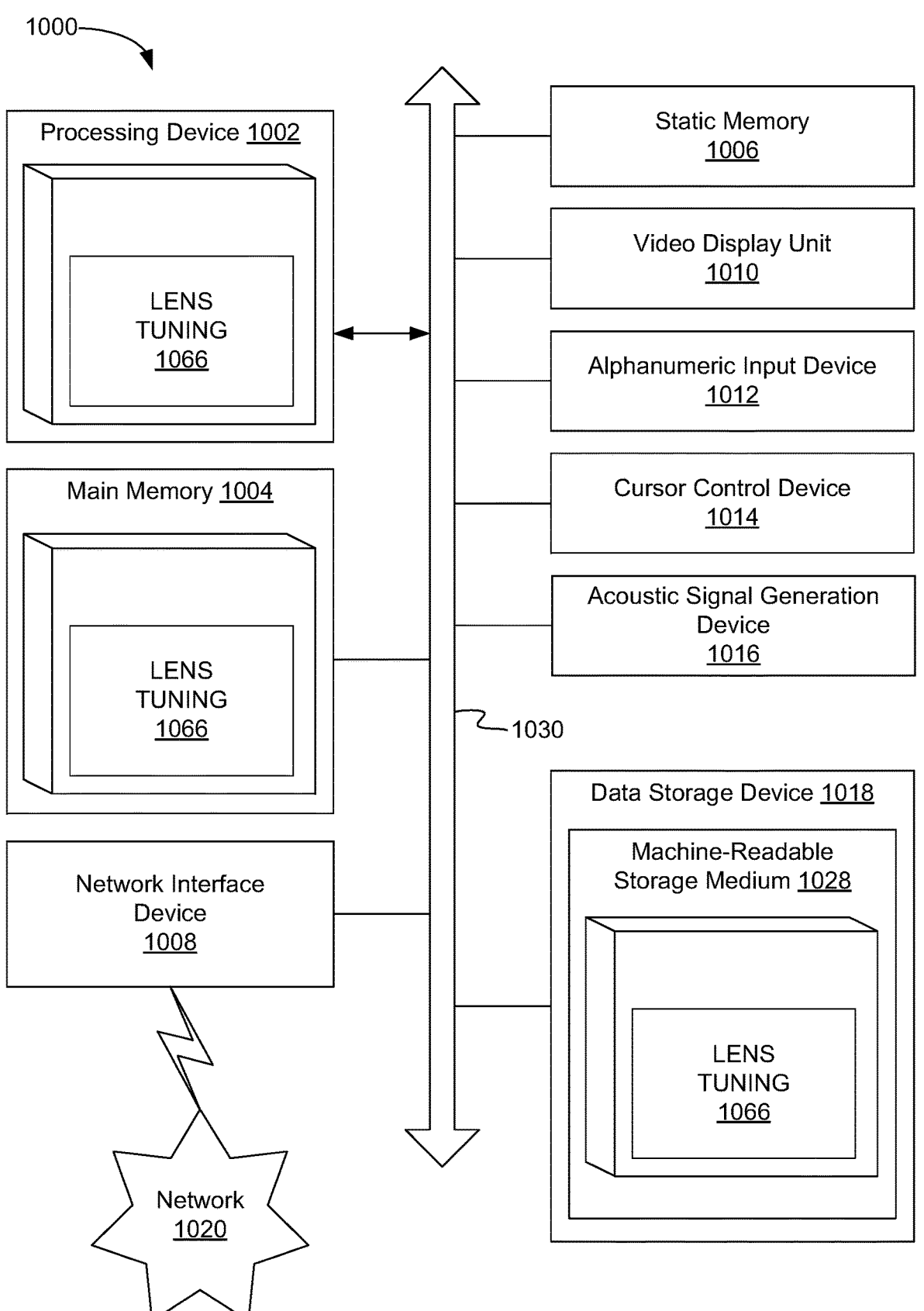
FIG. 10 is a block diagram of an example computing device that may perform one or more of the operations described herein, in accordance with one or more aspects of the disclosure.

FIG. 10 is a block diagram of an example computing device 1000 that may perform one or more of the operations described herein, in accordance with one or more aspects of the disclosure. Computing device 1000 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1000 may include a processing device (e.g., a general purpose processor, a PLD, etc.) 1002, a main memory 1004 (e.g., synchronous dynamic random access memory (DRAM), read-only memory (ROM)), a static memory 1006 (e.g., flash memory and a data storage device 1018), which may communicate with each other via a bus 1030.

Processing device 1002 may be provided by one or more general-purpose processing devices such as a microprocessor, central processing unit, or the like. In an illustrative example, processing device 1002 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1002 may also include one or more special-purpose processing devices such as an application specific integrated circuit (ASIC), a field programmable gate array (FPGA), a digital signal processor (DSP), network processor, or the like. The processing device 1002 may execute the operations described herein, in accordance with one or more aspects of the present disclosure, for performing the operations and steps discussed herein.

Computing device 1000 may further include a network interface device 1008 which may communicate with a network 1020. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

Data storage device 1018 may include a computer-readable storage medium 1028 on which may be stored one or more sets of instructions that may include instructions for tuning the tunable lenses described herein, e.g., lens tuning 1066 for carrying out the operations described herein, in accordance with one or more aspects of the present disclosure. The instructions for lens tuning 1066 may also reside, completely or at least partially, within main memory 1004 and/or within processing device 1002 during execution thereof by computing device 1000, main memory 1004 and processing device 1002 also constituting computer-readable media. The instructions for lens tuning 1066 may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation. As used herein, the term "and/or" includes any and all combinations of one or more of the associated listed items.

What is claimed is:

1. A light detection and ranging (LIDAR) system, comprising:

a beam collimator;

a plurality of first lenses;

a plurality of tunable lenses, each tunable lens disposed adjacent a respective one of the plurality of first lenses such that the respective one of the plurality of first lenses is between the tunable lens and the beam collimator;

one or more optical sources to generate a plurality of optical beams, each of the plurality of optical beams passes through one of the tunable lenses and one of the first lenses towards the beam collimator and transmitted towards a target, wherein each of the plurality of tunable lenses is separately controllable by selectively applying voltage to the tunable lens to adjust a focal length of the tunable lens to compensate for a variation in focus positions of the plurality of first lenses; and a controller to adjust the one or more of the plurality of tunable lenses based on a signal-to-noise ratio (SNR) that is determined from a return beam from the target corresponding to one of the plurality of optical beams.

2. The LIDAR system of claim 1, wherein one or more of the plurality of tunable lenses comprises a liquid crystal layer.

3. The LIDAR system of claim 1, wherein the LIDAR system further comprises an optical receiver to receive the return beam from the target corresponding to one of the plurality of optical beams.

4. The LIDAR system of claim 1, wherein at least one of the plurality of tunable lenses comprises a first portion to adjust the focal length of the tunable lens in a first plane and a second portion to adjust the focal length of the tunable lens in a second plane.

5. The LIDAR system of claim 4, wherein the first portion is separately controllable from the second portion.

6. The LIDAR system of claim 1, wherein one or more of the plurality of tunable lenses is controllable to change from a converging lens to a diverging lens.

7. The LIDAR system of claim 1, wherein each of the plurality of optical beams is to pass through the beam collimator towards a scanning mirror of the LIDAR system.

8. A method of operating a light detection and ranging (LIDAR) system, the method comprising:

providing a plurality of tunable lenses, each tunable lens disposed adjacent a respective one of a plurality of first lenses such that the respective one of the plurality of first lenses is between the tunable lens and a beam collimator;

transmitting, by a plurality of optical sources, a plurality of optical beam, each of the plurality of optical beams to pass through one of the plurality of tunable lenses and one of the plurality of first lenses towards the beam collimator and transmitted towards a target;

controlling at least one of the plurality of tunable lenses to adjust a focal length of the tunable lens to compensate for a variation in focus positions of the plurality of first lenses; and adjusting, by a controller of the LIDAR system, the one or more of the plurality of tunable lenses based on a signal-to-noise ratio (SNR) determined from a return beam from the target corresponding to one of the plurality of optical beams.

9. The method of claim 8, wherein one or more of the plurality of tunable lenses comprises a liquid crystal layer.

10. The method of claim 8, further comprising:

dynamically adjusting, by the controller of the LIDAR system the focal length of one or more of the tunable lenses.

11. The method of claim 8, wherein the method further comprises:

receiving, by an optical receiver of the LIDAR system, the return beam that is reflected from the target corresponding to one of the plurality of optical beams.

12. The method of claim 8, wherein at least one of the plurality of tunable lenses comprises a first portion to adjust the focal length of the tunable lens in a first plane and a second portion to adjust the focal length of the tunable lens in a second plane independently of the first portion.

13. A light detection and ranging (LIDAR) system, comprising:

a tunable lens;

a first lens adjacent to the tunable lens;

an optical source to generate an optical beam to pass through the tunable lens and the first lens towards a target of the LIDAR system;

an optical receiver to receive a return beam from the target corresponding to the optical beam;

signal processing circuitry to determine at least one of a range or velocity of the target based on the return beam; and a controller to selectively apply an electrical signal to the tunable lens to adjust a focal length of the tunable lens, wherein the controller is further to adjust the tunable lens based on a signal-to-noise ratio (SNR) that is determined from the return beam.

14. The LIDAR system of claim 13, wherein the tunable lens comprises a liquid crystal layer.

15. The LIDAR system of claim 13, wherein the tunable lens comprises a first portion to adjust the focal length of the tunable lens in a first plane and a second portion to adjust the focal length of the tunable lens in a second plane, wherein the first portion is separately controllable from the second portion.

16. The LIDAR system of claim 15, wherein the first plane is orthogonal to the second plane.

17. The LIDAR system of claim 13, wherein the tunable lens is controllable to change from a converging lens to a diverging lens.

18. The LIDAR system of claim 13, further comprising a beam collimator and a scanning mirror, wherein the optical beam is to pass through the beam collimator towards the scanning mirror of the LIDAR system.

* * * * *